March 21, 1944.    O. W. HOSKING    2,344,932
RUBBER VALVE STEM
Original Filed Oct. 27, 1936
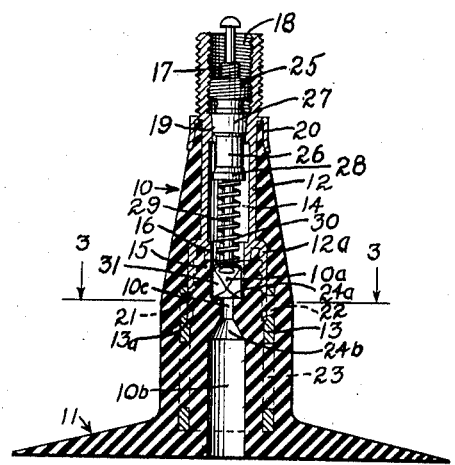
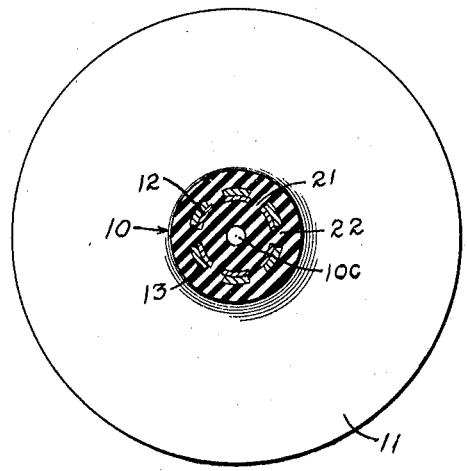
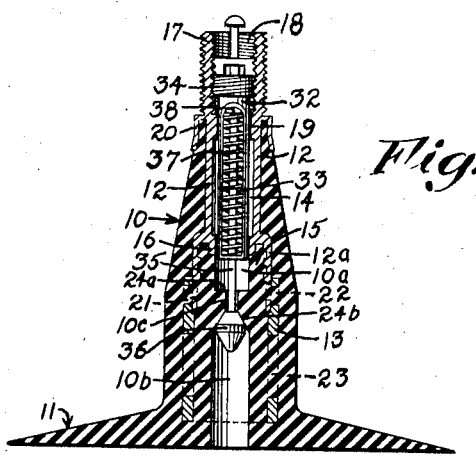
INVENTOR
Oakley W. Hosking
BY
Johnson, Kline, & Smyth
ATTORNEYS Patented Mar. 21, 1944

2,344,932

UNITED STATES PATENT OFFICE 2,344,932

RUBBER VALVE STEM

Oakley W. Hosking, Monroe, N. Y.

Original application October 27, 1936, Serial No. 107,832, now Patent No. 2,232,530, dated February 18, 1941. Divided and this application February 15, 1941, Serial No. 379,055

4 Claims. (Cl. 251—144)

This invention relates to a valve stem for inflatable articles, as, for example, pneumatic tire tubes and especially to a valve stem formed of molded rubber and having arranged therein a rigid metal valve-receiving insert.

The present application is a division of my copending application, Serial No. 107,832, filed October 27, 1936, now Patent No. 2,232,530, granted February 18, 1941.

More particularly, the present invention relates to a valve stem of the aforesaid type wherein a portion of the rigid metal insert or sleeve is surrounded with molded rubber both interiorly and exteriorly for a portion of its length, the interiorly lying rubber having a bore therethrough, the walls of which are so formed as to cooperate with portions of a valve mechanism when secured in the valve stem.

The principal object of the present invention is to provide a valve stem of the aforesaid type wherein those portions of the walls of the bore through the rubber which cooperate with a valve mechanism are adequately reenforced against distortion during use which would render them inoperative for their destined function.

In conjunction with the aforesaid object, it is also an object to provide a rubber valve stem so constructed that the metal valve-receiving insert or sleeve is mechanically, firmly and permanently secured therein in air-sealing relation, and without reliance upon adherence between the stem and insert such as is secured by vulcanization and the like; and also to provide a rubber valve stem of such construction that the danger of the metal valve-receiving insert blowing out of the stem under air pressure is obviated.

It has been proposed heretofore to construct rubber valve stems including a rigid metal insert or sleeve, in such a manner that the insert reenforces an integral rubber valve seat, but in these prior constructions, the insert extended inward merely to a point above and adjacent the integral valve seat. As a result, the rubber valve seat was not adequately reenforced, and the rubber stem below the seat was subject to ballooning under the influence of air pressure, whereby the valve seat becomes so distended as to be rendered inoperative.

According to the present invention, the metal of the rigid insert or sleeve surrounds and extends both above and below the portions of the rubber walls of the bore of the stem which cooperate with valve mechanisms, and adequately reenforces said portions not only against distention as a result of the stresses applied thereto by the valve mechanism during normal use, but also against ballooning of the stem.

Further objects and advantages will become apparent from the following detailed description, taken in connection with the accompanying drawing, wherein:

Figure 1 is a longitudinal sectional view through a valve stem embodying the invention and on an enlarged scale, a conventional form of valve insides or core being shown as arranged in the metal valve-receiving insert or sleeve.

Fig. 2 is a view similar to Fig. 1 but shows a valve mechanism mounted in the middle valve-receiving insert or sleeve with the valve thereof seating against an integral part of the stem.

Fig. 3 is a sectional view taken substantially on the line 3—3' of Fig. 1 in the direction of the arrows.

A valve stem embodying the present invention is formed of molded rubber and comprises a stem portion 10 and a base portion 11 which is vulcanized to the inflatable article to which the stem is applied. A rigid metal valve-receiving insert or sleeve is molded in the stem and comprises two separable members 12 and 13. When the valve stem is a short stem, only the member 12 need be employed as the insert or sleeve in the stem, but when the valve stem is a long stem, member 13 may be telescoped upon the enlarged end 12a of the member 12 until the end of said member seats against an internal shoulder 13a formed within the member 13.

The central portion of member 12 is provided with a bore 14 communicating with a counterbore 15 in the enlarged portion 12a of the member, the wall of said bore preferably being provided with annular grooves and ribs. An annular flange 16 projects downward from the central portion of the member 12 into the counterbore 15. Member 12 beyond its central portion is provided with an exteriorly threaded nipple 17 that has a threaded bore 18. The bore 14 in the central portion of the member and the threaded bore 18 in the nipple 17 of the member are in communication by a tapered bore 19. The member 12 adjacent the junction between the nipple 17 and the central portion thereof is provided exteriorly with a ferrule-shaped portion 20 and embraces the outer end of the rubber stem 10 as will later be referred to.

The lower end of the enlarged portion 12a of the member 12 is provided with a plurality of circumferentially spaced openings 21 which, when the member 13 is telescoped with the said end of the member 12 lie in alignment or partial alignment with a similar series of openings 22 formed in member 13 adjacent its end. The member 13 is also provided with a series of circumferentially spaced longitudinally extending slots 23.

The rubber stem 10 is molded on the rigid metal valve-receiving insert or sleeve with a portion of the rubber located within the metal insert or sleeve below the flange 16 thereof and the said portion is provided with bores 10a and 10b connected by a restricted passage 10c. At the upper end of the constriction 10c, an annular rubber shoulder 24a is formed, facing the tip of the stem at the lower end of bore 10a, while constriction 10c terminates at its lower end at the end of bore 10b in a tapered rubber seat 24b facing the base of the stem.

According to the present invention, the counterbore 15 in the rigid metal member 12 together with the telescoped rigid metal member 13 which are surrounded both internally and exteriorly with rubber form a rigid reenforcement for the rubber shoulder 24a and seat 24b, extending above and below said shoulder and seat.

It will be seen that when the rubber stem is molded on the valve-receiving sleeve or insert, the rubber will flow through the openings 21 in member 12, and openings 22 and slots 23 in member 13, and in effect, mechanically unite the stem to the metal insert, thus forming a secure and permanent connection therebetween without reliance upon adhesion as would be the case where the stem is merely vulcanized to the rubber insert. This construction possesses the decided advantage that all danger is obviated of the insert being forced or blown out of the stem due to air pressure in the article to which the stem is attached. Likewise, it will be noted that the rubber of the stem fills the grooves in the counterbore 15 of member 12 and extends between flange 16 and the wall of the counterbore thus providing for a secure connection between the insert and the stem.

The fact that the metal valve-receiving insert or sleeve is entirely embedded in the rubber stem for a portion of its length, that is, with the rubber of the stem located both exteriorly and interiorly of the insert or sleeve, eliminates the likelihood of air escaping between the insert and stem, since the air would have to work around the insert starting from flange 16 and it will readily be seen that its path would be so long and tortuous that escape by this route would be impossible.

Moreover, the insert in extending from the tip of the stem almost to the base imparts sufficient strength to the rubber of the stem to assure that no ballooning or bulging of the rubber will occur under the influence of air pressure within the bore of the stem.

In order to provide a symmetrical appearance to the stem, the outer end thereof is tapered as clearly illustrated, and the extreme tip end of the rubber stem extends between the ferrule 20 and the main portion of member 12, thus protecting the outer end of the rubber against damage by a valve cap or by the air chucks of air lines.

It will be noted that the mechanical connection between the stem and the insert occurs at the portion of the stem of relatively greater thickness, whereby a large amount of rubber forms the mechanical connection or interlock, and the latter possesses the requisite strength to securely maintain the insert in position in the stem. Not only does the connection between the insert and the stem adequately prevent the insert from being blown out of the stem, but since no reliance is placed on adhesion between the rubber and the insert, any desired and suitable metal can be used for the insert. In vulcanizing rubber to metal, difficulty has been experienced in obtaining the necessary adhesion between the metal and the rubber and the present construction eliminates this difficulty altogether.

The valve stem as illustrated is adapted to receive a valve insides or cores of the conventional type, or, if desired, a valve core having a closure member which seats against an integral part of the rubber stem to close the passage therethrough.

For instance, Fig. 1 illustrates the use of a valve insides of the conventional type employed in the valve stem of the present invention in a manner well known in the art. This valve insides comprises a threaded plug and a bridge portion 25 that is swively connected to a barrel 26 having adjacent one of its ends a tapered gasket-carrying portion 27 while its opposite end acts as a seat for the valve closure 28. A valve pin 29 projects through the plug and barrel and has fixed thereto the valve closure 28 which seats against the lower end of the barrel below the gasket-carrying portion 27. A valve spring 30 is mounted on the pin, and said spring at its lower end abuts an abutment member 31 slidably associated with the valve pin and adapted to urge the valve closure 28 constantly against its seat. The member 31 is supported on the annular rubber shoulder 24a integrally formed in the wall of the rubber bore of the stem.

The thrust of spring 30 is supported by the shoulder 24a and if the latter were not sufficiently reenforced, the thrust would tend to distort the shoulder, allowing the abutment member 31 to protrude through the constricted passage 10c rendering the spring 30 inoperative to seat the valve closure. This would be even more likely to occur as a result of ballooning of the rubber portion of the valve stem in which shoulder 24a is located. However, according to the present invention, the metal of the rigid insert members 12 and 13, by surrounding and extending above and below the said shoulder, adequately reenforce it against such distortion from spring thrust or from ballooning.

The above-described form of valve insides is well known and reference to Fig. 1 will indicate how the insides is positioned within the valve stem by screwing plug 25 into nipple 17 of the insert until the gasket portion 27 of the barrel is brought into a tight fit in tapered passage 19 in the insert, while abutment member 31 is brought into engagement with rubber shoulder 24a at the lower end of bore 10a in the valve stem.

Obviously, other types of conventional insides or cores, such as those wherein the valve spring is mounted above the plug or those wherein the valve spring is housed within the barrel can be just as readily employed in the valve stem of the present construction.

It has been proposed to eliminate the use of valve insides or cores of the conventional type in rubber valve stems by employing a valve which seats against the integral part of the stem. As illustrated in Fig. 2, the valve stem of the present invention can also be employed with the last-mentioned type of valve.

In this instance, the valve comprises an elongated metal barrel 32 having diametrically opposed slots 33 formed therein and provided at its outer end with an externally threaded enlarged portion 34 similar to the plug portion 25 in the usual valve insides previously referred to. The valve pin 35 extends through the barrel 32 as clearly shown in Fig. 2 and is provided at its lower end with a conical valve closure 36. A coil spring 37, located within the barrel 32 and acting against an abutment lug 38 on the pin, serves to normally urge the pin and valve closure in valve-seating direction.

In order to make the valve core illustrated in Fig. 2, the slotted portion of barrel 32 is first constructed separately from the enlarged threaded portion 34, the two portions being adapted to be subsequently secured together, for instance, by telescopic engagement and "rolling on" of the telescopically engaged portions of the said members. Before assembling the two members, the valve pin 35 bearing the valve closure 36 at one end, but minus the abutment lug 38 and the head illustrated at the upper end of the pin, is inserted through the base of the barrel 32, while spring 37 is inserted from the opposite end of the barrel. The lug 38 is then formed, for instance, by clinching the metal of the pin thereby securing the spring 37 permanently between the said lug and the lower end of barrel 32. The threaded member 34 is then slipped over the upper end of pin 35 and secured to the upper end of barrel 32, for instance in the aforesaid manner. A head is formed on the end of pin 35 which projects outwardly from the threaded portion 34.

When this form of valve is used in the valve stem of the present construction, it is positioned within the insert from the outer end thereof and the threaded portion 34 screwed into the nipple 17 until the lower end of the valve head engages the shoulder 24a at the lower end of the bore 10a in the rubber stem. The valve pin 35 may then be depressed to force the valve closure through the restricted passage 10c in the stem, it being understood that the walls of said passage will yield sufficiently to allow the valve closure to pass therethrough, after which portion 34 is screwed further into the nipple 17 until the valve closure 36 has passed entirely through the restricted passage 10c. When the valve has thus been positioned, spring 37 will act to hold the valve closure firmly against the tapered seat 24b in the valve stem to thus seal against the passage of air through the stem. The valve 36 may be unseated by depressing the valve pin 35 when it is desired to inflate or deflate the article to which the stem is attached.

The last-described form of valve can be removed from the stem by unscrewing the portion 34 thereof from the nipple 17, and of course, when this is done, the valve closure 36 is forced through the restricted passage 10c in the rubber stem.

It will be understood that although the valve head 36 can be forced through the restricted passage 10c of the stem in order to mount the valve or to remove the same from the stem, nevertheless, since the rigid metal portions 12 and 13 of the insert surround and extend both above and below the seat 24b, the latter is reenforced in the same manner as shoulder 24a so that it will not be distended by the pressure of air against the valve closure 36, tending to blow the latter through the construction 10c, and retaining the valve seat against distention as a result of ballooning of the stem which would render the seat ineffective.

In the event that the tapered seat 24b should become worn, or it should otherwise be undesirable to employ the last-described form of valve in the valve stem, then such valve could be removed and one of the usual forms of valve insides employed therewith.

Variations and modifications may be made within the scope of this invention and portions of the improvements may be used without others.

I claim:

1. A rubber valve stem having a longitudinal passage extending therethrough from base to tip, comprising a rubber body portion having a bore therethrough forming at least a portion of said passage; a constriction intermediate the ends of said bore forming a rubber valve seat integral with the rubber walls of the bore and facing the base of the stem; a rigid tubular valve core-receiving insert extending into the tip of said rubber body having a portion comprising its inner end embedded in the rubber of said body and secured therein, said rubber lying both exteriorly and interiorly of said embedded portion, and the latter extending above and below said integral valve seat; and a valve core secured in said insert, comprising means for securing it thereto, and a spring-pressed valve closure normally urged against said integral rubber valve seat to seal the passage through the stem against efflux of air, said closure being adapted to be pushed through said constriction only by a force materially in excess of the force applied thereto by air under pressure in the bore of said stem.

2. A rubber valve stem having a longitudinal passage extending therethrough from base to tip, comprising a rubber body portion having a bore therethrough forming at least a portion of said passage; a constriction intermediate the ends of said bore forming a rubber valve seat integral with the rubber walls of the bore and facing the base of the stem; a rigid tubular valve core-receiving insert extending into the tip of said rubber body and having a portion including its inner end embedded in the rubber of said body, said rubber lying both exteriorly and interiorly of the embedded portion, and the latter having interlocking engagement with said rubber, surrounding said seat, and extending above and below said seat; and a valve core secured in said insert, comprising means for securing it thereto, and a spring-pressed valve closure normally urged against said integral rubber valve seat to seal the passage through the stem against efflux of air, said closure being adapted to be pushed through said constriction only by a force materially in excess of the force applied thereto by air under pressure in the bore of said stem.

3. In a valve stem having a passage therethrough extending from base to tip with an internally threaded portion adjacent the tip and a valve seat formed by the walls of said passage inwardly of the threaded portion and facing the base of the stem, a valve core comprising a metal barrel having an internal bore, an enlarged threaded portion adjacent one end for engaging the threaded portion of the stem, an internal annular flange at its inner end, a perforated bridge spanning its outer end, and a pair of oppositely disposed slots extending longitudinally of the barrel from said threaded portion to said flange; a valve pin slidably extending through said perforated bridge and said annular flange, and supported thereby in a substantially axial position, said valve pin carrying a valve closure beyond said flange for engaging the valve seat in the valve stem; an abutment on said pin between the ends of the barrel; and a compression spring surrounding said pin, supported on said annular flange, and engaging said abutment for urging the valve closure against the valve seat in the bore of the stem.

4. A rubber valve stem having a longitudinal passage extending therethrough from base to tip, the rubber of said stem forming at least a portion of said passage; a constriction intermediate the ends of said bore forming a rubber valve seat integral with the rubber walls of the bore and facing the base of the stem; a rigid tubular valve core-receiving insert extending into the tip of said rubber body having a portion comprising its inner end embedded in the rubber of said body and secured therein, said rubber lying both exteriorly and interiorly of said embedded portion and the latter extending above and below said integral valve seat; and a valve core supported by said insert and having a valve closure adapted to cooperate with said valve seat for closing the passage through the stem against efflux of air, the passage through the stem outwardly of said constriction being adapted to permit introduction and removal of the valve closure through the tip of the stem, and said constriction yielding resiliently to a force materially in excess of that applied to said valve closure by air under pressure within the bore of the stem, to permit forcible insertion and removal of the valve closure therethrough, but retaining said valve closure against ejection from the stem by air under pressure within the bore thereof.

OAKLEY W. HOSKING.